United States Patent [19]
Anton et al.

[11] Patent Number: 5,912,280
[45] Date of Patent: Jun. 15, 1999

[54] INK JET INKS CONTAINING EMULSION-POLYMER ADDITIVES TO IMPROVE WATER-FASTNESS

[75] Inventors: Waifong Liew Anton; Milan Bohuslav Bednarek, both of Wilmington; Edward George Howard, Jr., Hockessin; Kathryn Amy Pearlstine, Wilmington, all of Del.; Soodebeh Tronson, San Carlos, Calif.

[73] Assignee: E. I. du Pont de Nemours and Company, Wilmington, Del.

[21] Appl. No.: 08/774,986

[22] Filed: Dec. 27, 1996

[51] Int. Cl.⁶ .................................................. C09D 11/10
[52] U.S. Cl. .................. 523/161; 523/201; 260/DIG. 38; 524/458; 524/545; 106/31.13
[58] Field of Search ..................... 523/161, 201; 260/DIG. 38; 106/20 D; 524/458, 545

[56] References Cited

U.S. PATENT DOCUMENTS

| | | | |
|---|---|---|---|
| 3,560,568 | 2/1971 | Resnick | 562/111 |
| 4,433,082 | 2/1984 | Grot | 524/544 |
| 4,597,794 | 7/1986 | Ohta et al. | 106/20 C |
| 4,781,985 | 11/1988 | Desjarlais | 428/421 |
| 4,876,313 | 10/1989 | Lorah | 525/281 |
| 5,021,469 | 6/1991 | Langerbeins et al. | 523/201 |
| 5,053,495 | 10/1991 | Greenwood et al. | 534/829 |
| 5,085,698 | 2/1992 | Ma et al. | 106/20 D |
| 5,212,251 | 5/1993 | Lorah et al. | 525/279 |
| 5,679,724 | 10/1997 | Sacripante et al. | 523/161 |

FOREIGN PATENT DOCUMENTS

| | | | |
|---|---|---|---|
| 3-79679 | 4/1991 | Japan | C09D 11/00 |
| 4-275315 | 9/1992 | Japan | C08F 257/00 |
| 92/15649 | 9/1992 | WIPO | C09D 11/02 |

OTHER PUBLICATIONS

JP3079679 A, Database WPI Abstract XP–002060529, Ink Jet Record Aqueous Ink Composition Contain Fluorine Contain Resin Disperse Print Grade Nozzle Jet Stabilised, *Derwent Publications Ltd.*, Week 9120, Apr. 4, 1991.

JP 5295048 A, Database WPI, Abstract XP–002060530, Novel Aqueous Resin Composition For Aqueous Inks of Good Lustre, *Derwent Publications, Inc.*, Week 9349, Nov. 9, 1993.

*Primary Examiner*—Marion McCamish
*Assistant Examiner*—John J. Guarriello
*Attorney, Agent, or Firm*—Joseph A. Tessari

[57] ABSTRACT

Water-fastness of inks containing pigment and a polymeric dispersant is improved by the addition of core-shell or tetrafluoroethylene emulsion polymers. The printed ink images exhibit improved resistance to smudge or smear when handled or marked with highlight pens.

23 Claims, No Drawings

INK JET INKS CONTAINING EMULSION-POLYMER ADDITIVES TO IMPROVE WATER-FASTNESS

FIELD OF THE INVENTION

This invention relates to aqueous inks for ink jet printers, and more particularly, to aqueous inks containing a core-shell or tetrafluoroethylene emulsion polymer as an additive to improve water-fastness of the applied ink.

BACKGROUND OF THE INVENTION

Ink jet printing is a non-impact printing process in which droplets of ink are deposited on a substrate such as paper or transparency film in response to an electronic signal. Low cost and high quality of the output, combined with relatively noise free operation, have made ink jet printers a popular option to other types of printers used with computers.

Dyes and pigments are used as colorants in inks adapted for use in ink jet printers. Dyes typically provide superior color properties immediately after printing, but are light sensitive and the printed image will tend to fade. Dyes also remain water-soluble after printing, causing the printed image to smear when contacted with moisture.

Pigment colorants offer superior light-fastness and water-fastness, compared to dyes. Polymeric dispersants are employed to form a stable dispersion of the pigment particles in the ink. Representative dispersants proposed for this purpose include polyvinyl alcohol, cellulosic materials, ethylene oxide modified phenols, and ethylene oxide/propylene oxide polymers. More recently, commercial inks have employed a structured polymer dispersant as disclosed in U.S. Pat. No. 5,085,698 to Ma et al. While inks containing pigment colorants generally offer superior water-fastness (compared to inks containing dyes), it is desirable that further improvements be made, particularly for end-use applications wherein the printed image will be exposed to substantial moisture. Water soluble polymeric binders and emulsions have been proposed as additives for this purpose, as in U.S. Pat. No. 5,085,698 to Ma et al. When added at concentrations high enough to form tough protective films, however, it has been found that such additives generally increase the ink viscosity to the extent that the ink will not print in conventional ink jet printers. Accordingly, there is a need for specific additives that will improve water-fastness of inks containing pigment dispersions that are particularly adapted for use in ink jet printers.

SUMMARY OF THE INVENTION

It has now been found that core-shell emulsion polymers and tetrafluoroethylene emulsion polymers may be added to inks containing insoluble colorants in effective quantities to improve water-fastness of the printed image, without increasing viscosity of the ink to the extent that it compromises performance of an ink jet printer pen. The resulting inks are stable, exhibit excellent print quantity, provide excellent water-fastness, and favorable decap time. The printed images have improved integrity after being marked with a highlighter ("smear"), and after being handled by moist fingers ("smudge).

The inks may be used with a variety of ink jet printers (e.g., continuous flow and piezoelectric), and are particularly useful with thermal drop-on-demand printers. The inks also may be used with air brush printing devices.

DETAILED DESCRIPTION OF THE INVENTION

Inks provided by the invention may be used in a variety of printers, but are particularly well suited for use with a thermal drop-on-demand ink jet printer. The ink has an aqueous carrier medium and contains an insoluble colorant, which may be a disperse dye but preferably is a pigment. A dispersant, preferably a structured polymer, is used to form a stable dispersion of the colorant in the aqueous carrier medium. In accordance with the invention, the ink contains a core-shell emulsion polymer or a tetrafluoroethylene emulsion polymer in an amount effective to improve image permanence such as water-fastness and/or smear-fastness of images printed with the ink. The inks may be adapted to the requirements of a particular ink jet printer to provide a balance of light stability, viscosity, surface tension, high optical density, and crust resistance.

AQUEOUS CARRIER MEDIUM

The aqueous carrier medium is water or a mixture of water and one or more water-soluble organic solvent. Selection of the medium depends on requirements of the specific application, such as surface tension and viscosity, the selected colorant, drying time of the ink, and the type of substrate onto which the ink will be printed. Representative solvents that may be selected are disclosed in U.S. Pat. No. 5,085,698. A mixture of water and a polyhydric alcohol, such as diethylene glycol, is preferred. If a mixture of water and a solvent is used, the aqueous carrier medium usually contains from about 30% to about 95% (preferably 60 to 95%) water with the balance being the water-soluble organic solvent.

The amount of aqueous carrier medium in the ink is approximately 70 to 99.8% (preferably 94 to 99.8%) based on total weight of the ink when an organic pigment is selected; approximately 25 to 97.5% (preferably 70 to 97.5%) when an inorganic pigment is selected; and 80 to 99.8% when a disperse dye is selected.

INSOLUBLE COLORANTS

The insoluble colorant preferably is a pigment, but may be a disperse dye. A dispersant is used to assist in forming a stable dispersion of the insoluble colorant in the aqueous carrier medium.

Pigment A wide variety of organic and inorganic pigments may be selected, alone or in combination. The pigment particles are sufficiently small to permit free flow of the ink through the ink jet printing device, especially at the ejecting nozzles that usually have a 10 to 50 micron diameter. Particle size also has an influence on the pigment dispersion stability, which is critical throughout the life of the ink. Brownian motion of minute particles will help prevent the particles from settling. It is also desirable to use small particles for maximum color strength. The range of useful particle size is approximately 0.005 micron to 15 micron. Preferably, the pigment particle size is between 0.005 to 5 micron, and most preferably between 0.01 to 0.3 micron.

The selected pigment may be used in dry or wet form. For example, pigments are usually manufactured in aqueous media and the resulting pigment is obtained as water wet presscake. In presscake form, the pigment is not aggregated to the extent that it is in dry form. Thus, pigments in water wet presscake form do not require as much deaggregation in the process of preparing the inks from dry pigments. Representative commercial dry and presscake pigments that may be used in practicing the invention are disclosed in U.S. Pat. No. 5,085,698.

Fine particles of metal or metal oxides also may be used and are included in the term "insoluble colorant" as used herein. For example, metal and metal oxides are suitable for the preparation of magnetic ink jet inks. Fine particle size oxides, such as silica, alumina, titania, and the like, also may be selected. Furthermore, finely divided metal particles, such as copper, iron, steel, aluminum and alloys, may be selected for appropriate applications.

In the case of organic pigments, the ink may contain up to approximately 30% pigment by weight, but typically will be in the range of approximately 1 to 15% (preferably 1 to 8%) by weight of the total ink composition for most thermal ink jet printing applications. If an inorganic pigment is selected, the ink will tend to contain higher weight percentages of the pigment than with comparable inks employing organic pigment, and may be as high as 50% because inorganic pigments generally have higher specific gravities than organic pigments.

Disperse Dyes The color and amount of disperse dye used in the ink is a matter of choice, being primarily dependent upon the desired color of the print achieved with the ink, the purity of the dye, and its strength. Low concentrations of dye may not give adequate color vividness. High concentrations may result in poor printhead performance or unacceptably dark colors. The disperse dye may be present in the amount of 0.01 to 20% by weight, preferably 0.05 to 8% by weight, more preferably 1 to 5% by weight, based on the total weight of the ink. Representative disperse dyes that may be useful in practicing this invention are disclosed in U.S. Pat. No. 5,053,495; U.S. Pat. No. 5,203,912; and U.S. Pat. No. 5,102,448.

Dispersant Suitable polymeric dispersants include random polymers and structured polymeric dispersants, such as block copolymers and branched polymers. The polymers may be anionic, cationic, or non-ionic in nature.

Random polymers are not as effective in stabilizing pigment dispersions as structured polymers and, therefore, are not preferred. However, a random polymer having both hydrophilic sections for aqueous solubility and hydrophobic sections for interaction with the pigment, and an average molecular weight to contribute to the dispersion stability, can be effectively selected. Such polymeric dispersants are disclosed in U.S. Pat. No. 4,597,794.

Block polymers having AB, BAB and ABC type structures are preferred dispersants. A block polymer which has hydrophobic and hydrophilic blocks, and balanced block sizes to contribute to the dispersion stability, may be used to advantage. Functional groups can be built into the hydrophobic (pigment binding) block for stronger specific interactions between the pigment and the polymer dispersant to provide improved dispersion stability. A detailed description of these polymers is found in the aforementioned U.S. Pat. Nos. 5,085,698; 5,272,201; and 5,519,085.

As mentioned in these references, it may be necessary to make salts of functional groups contained in the polymer to render it soluble in the aqueous carrier medium. Salts of the acid monomers can be made with the counter component being selected from organic bases such as mono-, di-, tri-methylamine, morpholine, n-methyl morpholine; alcohol amines such as dimethylethanolamine, methyldiethanolamine, mono-, di-, and tri-ethanolamine; pyridine; ammonium hydroxide; tetra-alkylammonium salts such as tetramethylammonium hydroxide, tetraethylammonium hydroxide; alkali metals such as lithium, sodium and potassium, and the like. Preferred neutralizing agents include dimethylethanolamine and sodium and potassium hydroxides, with potassium hydroxide being particularly preferred for inks adapted for use in thermal ink jet printers. Salts of the amino monomers can be made with the counter component being selected from organic acids such as acetic acid, formic acid, oxalic acid, dimethylol propionic acid, halogens such as chloride, fluoride, and bromide, and other inorganic acids, such as sulfuric acid, nitric acid, phosphoric acid and the like. It is also possible to convert the amino group into a tetra-alkyl ammonium salt. Amphoteric polymers (i.e., a polymer containing both an acid group and an amino group) may be used as is, or can be neutralized with either an acid or base.

Alternatively, other polymeric dispersants may be selected, but it will be difficult to formulate inks having the reliable balance of properties that are achieved using the preferred structured polymers. Dispersants such as polyvinyl alcohol, cellulosic materials, ethylene oxide modified phenols, and ethylene oxide/propylene oxide polymers may be selected for some applications.

The amount of the polymer depends on the structure, molecular weight and other polymer properties, and on the other components of the ink composition. The block polymers have a number average molecular weight below 20,000; preferably below 10,000; and typically in the range of 1,500 to 6,000.

The polymeric dispersant is present in the amount of 0.1 to 25% (preferably 0.1 to 8%) by weight, based on the total weight of the ink composition. If the amount is too high, it will be difficult to maintain the desired ink viscosity. Dispersion stability will be adversely affected if insufficient polymer is present.

EMULSION POLYMER ADDITIVE

The emulsion polymer additive may be a core-shell emulsion polymer or a tetrafluoroethylene emulsion polymer.

Core Shell Emulsion Polymer As used herein, the term "core shell emulsion(s)" means particles containing two distinct separate phases having different glass transition temperatures (Tg). The two phases are obtained by feeding an initial charge of monomer(s) into a reaction vessel, waiting for complete reactive consumption of the initial charge, then adding a second charge of monomer(s).

The polymer made from the polymerization of one of the monomer charges, which may be a mixture, has a Tg below ambient temperature. Compositions include any combinations of acrylates such as butyl, ethyl, ethylhexyl, methyl, hydroxyethyl, propyl, ethoxylethyl, benzyl and the like, and methacrylates such as ethylhexyl, lauryl, octyl, hexyl, acetylacetoxy, n-butyl, and tris(trimethylsiloxy)-silylpropyl methacrylate. This polymer also may contain small amounts of crosslinking agents such as ethylene glycoldimethacrylates and allyl methacrylate. Small amounts of higher Tg components, such as those listed below for the second monomer charge, are acceptable so long as the overall Tg of the resultant polymer is below ambient temperature.

The polymer made from the polymerization of the other monomer charge, which may be a mixture, has a Tg above ambient temperature. Compositions include any combinations of styrene, methyl-styrene, vinyl pyrrolidone, and methacrylates such as iso-butyl, methyl, hydroxyethyl, isobornyl, propyl, benzyl, ethyl, cyclohexyl, benzyl, glycidyl and the like. Small amounts of low Tg components, such as those listed above, are acceptable so long as the overall Tg of the resultant polymer is above ambient temperature.

These two different charges may be added in any order, provided the addition of the second charge is started only after the complete conversion of the first charge. The weight ratio of low Tg polymer segment is present in the range of 55 to 95%. The weight ratio of the higher Tg polymer segment is present in the range of 5 to 45%.

The core/shell additives may be present in the amount of 0.01 to 20% solids by weight, preferably 0.01 to 5% solids by weight for thermal ink jet printing applications, and 5.1 to 20% solids by weight for continuous flow, piezo and air brush printing applications, based on the total weight of the ink composition.

Tetrafluoroethylene Emulsion Polymer The tetrafluoroethylene emulsion polymer may be a copolymer or homopolymer emulsion. Depending upon the type of pen used, homopolymers may be as effective as the copolymers. The polymer has a fluorinated hydrocarbon backbone chain to which are attached the functional groups or pendant side chains which have the functional groups. The pendant side chains may contain, for example,

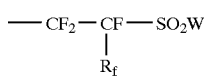

groups, wherein $R_f$ is F, Cl, or a $C_1$ to $C_{10}$ perfluoroalkyl radical; and W is F, Cl, or OH preferably F. Typically, the functional group in the side chains will be present in terminal

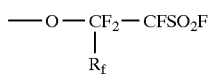

groups.

Fluorinated polymers of this kind are disclosed in U.S. Pat. Nos. 3,282,875; 3,560,568; and 3,718,627. More specifically, the polymers can be prepared from fluorinated monomers or fluorine substituted vinyl compounds. The polymers are made from at least two monomers, with at least one of the monomers coming from each of the two groups described below.

At least one monomer is a fluorinated vinyl compound such as vinyl fluoride, hexafluoropropylene, vinylidene fluoride, trifluoroethylene, chlorotrifluoroethylene, perfluoro (alkyl vinyl ether), tetrafluoroethylene, and mixtures thereof. In the case of copolymers used in electrolysis of brine, the precursor vinyl monomer desirably will not contain hydrogen.

The second group is the sulfonyl-containing monomers containing the precursor group

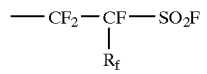

wherein $R_f$ is as defined above. Additional examples are represented by the general formula $CF_2=CF-T_k-CF_2SO_2F$ wherein T is a bifunctional fluorinated radical comprising 1 to 8 carbon atoms, and k is 0 or 1. Substituent atoms in T include fluorine, chlorine, or hydrogen, although generally hydrogen will be excluded in use of the copolymer for ion exchange in a chloralkali cell. The most preferred polymers are free of both hydrogen and chlorine attached to carbon, i.e., they are perfluorinated, for greatest stability in harsh environments. The T radical of the formula above can be either branched or unbranched, and can have one or more ether linkages. It is preferred that the vinyl radical in this group of sulfonyl fluoride containing comonomers be joined to the T group through an ether linkage, i.e., that the comonomer be of the formula $CF_2=CF-O-T-CF_2-SO_2F$. Illustrative of such sulfonyl fluoride containing comonomers are

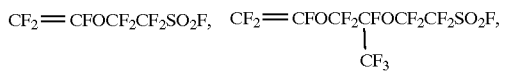

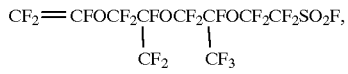

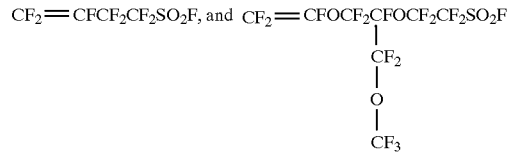

The most preferred sulfonyl fluoride containing comonomer is perfluoro (3,6-dioxa-4-methyl-7-octenesulfonyl fluoride),

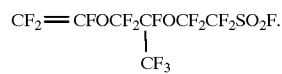

The sulfonyl-containing monomers and their preparation are disclosed in U.S. Pat. Nos. 3,282,875; 3,041,317; 3,718,627; and 3,560,568.

A preferred class of such polymers has repeating units represented by the formula:

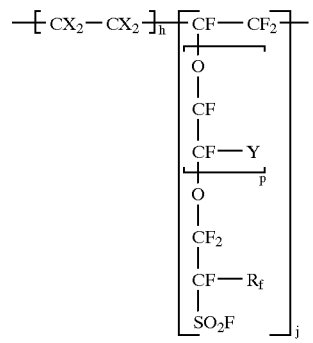

wherein:
h is 3 to 15;
j is 1 to 10;
p is 0, 1, or 2;
the X's taken together are four fluorines or three fluorines and one chlorine,
Y is F or $CF_3$; and
$R_f$ is F, Cl or a $C_1$ to $C_{10}$ perfluoroalkyl radical.

A most preferred copolymer is a copolymer of tetrafluoroethylene and perfluoro (3,6-dioxa-4-methyl-7-octenesulfonyl fluoride).

Such copolymers can be prepared by general polymerization techniques developed for homo- and copolymerizations of fluorinated ethylenes, particularly those employed for tetrafluoroethylene, which are described in the literature. Nonaqueous techniques for preparing the copolymers include that of U.S. Pat. No. 3,041,317, that is, by the polymerization of a mixture of the major monomer therein, such as tetrafluoroethylene, and a fluorinated ethylene containing a sulfonyl fluoride group in the presence of a free radical initiator, preferably a perfluorocarbon peroxide or azo compound, at a temperature in the range 0–200° C. and at pressures in the range of $10^5$ to $2\times10^7$ pascals (1–200 Atm.) or higher. The nonaqueous polymerization may, if desired, be carried out in the presence of a fluorinated solvent. Suitable fluorinated solvents are inert, liquid, perfluorinated hydrocarbons, such as perfluoromethylcyclohexane, perfluorodimethlcyclobutane, perfluorooctane, perfluorobenzene and the like, and inert, liquid chlorofluorocarbons such as 1,1,2-trichloro-1,2-2-trifluoroethane, and the like.

Aqueous techniques for preparing the copolymer include contacting the monomers with an aqueous medium containing a free-radical initiator to obtain a slurry of polymer particles in non-water-wet or granular form, as disclosed in U.S. Pat. No. 2,393,967, or contacting the monomers with an aqueous medium containing both a free-radical initiator and a telogenically inactive dispersing agent, to obtain an aqueous colloidal dispersion of polymer particles, and coagulating the dispersion, as disclosed, for example, in U.S. Pat. No. 2,559,752 and U.S. Pat. No. 2,593,583. Other alternate methods may be used to prepare the tetrafluoroethylene emulsion polymers.

Additional perhalogenated, polyfluorinated copolymers suitable for use in the present invention include those described in U.S. Pat. No. 4,851,161 which have the formula

—[CF$_2$CFY']—[CF$_2$CF(Q)]— wherein:

Y' includes F, Cl, R$_f$ or OR$_F$, R$_f$ is C$_{1-4}$ perfluoroalkyl;

Q is —CF$_2$OCF$_2$[CF(CF$_3$)OCF$_2$]$_m$—CFYCF$_2$X or —OCF$_2$[CF(CF$_3$)OCF$_2$]$_q$—CFYCF$_2$X m is 0 or 1–6;

q is 0 or 1–5;

Y is F or Cl;

X is a functional group including —SO$_3$R where R includes C$_{1-10}$ alkyl. The —SO$_3$R groups are convertible to sulfonic acid or sulfonate salt groups by hydrolysis.

Additional polyfluorinated ion exchange polymers suitable for use in the invention process include copolymers of TFE and vinyl ethers having the formula:

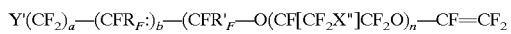

Y'(CF$_2$)$_a$—(CFR$_F$:)$_b$—(CFR'$_F$—O(CF[CF$_2$X"]CF$_2$O)$_n$—CF=CF$_2$ wherein:

Y" includes —SO$_2$Z' where Z' includes —OH, —OM, and —OR;

M is alkali metal or quaternary ammonium;

R is alkyl;

R$_F$ and R'$_F$ are F, Cl, CF$_3$ or CF$_2$Cl;

X" is F, Cl or Br;

a and b are 0 or an integer, and n is a least 1.

Still further perhalogenated polyfluorinated ion exchange polymers useful in preparing the liquid compositions of the present invention include copolymers of polyfluoroallyloxy compounds prepared as described in U.S. Pat. Nos. 4,275,225, 4,273,728 and 4,273,729 which have the formula

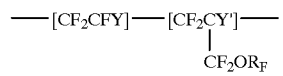

—[CF$_2$CFY]—[CF$_2$CY']—
|
CF$_2$OR$_F$ wherein:

Y includes F, Cl, R$_f$ or OR$_F$, R$_f$ is C$_{1-4}$ perfluoroalkyl;

Y' is F or Cl;

R$_F$ is —CFY"R'CFY"Q or —[CF$_2$CFY"O]$_n$R"Q;

Y" is F or CF$_3$;

R' is C$_0$–C$_{12}$ perfluoroalkylene;

n is 1–4;

R" is perfluoroalkylene;

Q is a functional group including —SO$_2$F which can be hydrolyzed to a sulfonic acid or sulfonate group.

The terms "perhalogenated" and "polyfluorinated" as used herein refer to the backbone polymer chain and the side chains of the polymer that carry the —SO$_3$M functional groups, but not to the —SO$_3$M group itself.

U.S. Pat. No. 4,433,082 describes a process for making a liquid composition containing a perfluorinated ion exchange polymer of equivalent weight in the range of 1050 to 1500, wherein water is admixed with one or more organic liquids such as lower alcohols and ethers that are completely miscible with water at room temperature.

Some suitable fluoropolymer emulsion polymers include tetrafluoroethylene with perfluoro-3,6-dioxa-5-trifluoromethyl-oct-7-enyl sulfonyl fluoride (PSEPVE) wherein sulfonyl fluoride groups have been hydrolyzed to sulfonic acid or sulfonate groups, tetrafluoroethylene with methyl perfluoro-4,7-dioxa-5-trifluoromethyl-non-8-enecarboxylate (EVE), tetrafluoroethylene/PSEPVE, acid form, tetrafluoroethylene/hexafluoropropylene, tetrafluoroethylene/perfluoromethyl ethyl ether and tetrafluoroethylene. These materials are commercially available under the tradenames Nafion® fluoropolymer emulsions, manufactured by E. I. du Pont de Nemours and Company, Wilmington, Del. These polymers are also available in various forms, e.g., beads or film, form Aldrich Chemical Co.

The fluoropolymer emulsion polymer additive may be present in the amount of 0.3 to 15% by weight, preferably 1 to 7% by weight, based on the total weight of the ink composition.

OTHER INGREDIENTS

Various types of additives may be used to optimize the properties of the ink compositions for specific applications. Surfactants may be used to alter surface tension, as well as maximize penetration. However, the type of surfactants and the amounts used need to be carefully selected to avoid pigment dispersion destabilization or to negate the benefits of the present inks. Biocides may be used in the ink compositions to inhibit growth of microorganisms. Sequestering agents such as EDTA may also be included to eliminate deleterious effects of heavy metal impurities. Other known additives, such as humectants, viscosity modifiers and other acrylic or non-acrylic polymers made also be added to improve various properties of the ink compositions as desired.

INK PROPERTIES AND PREPARATION

The ink compositions are prepared in a similar manner as other ink jet inks. The pigment dispersion is first prepared by premixing the selected pigment(s) or disperse dye(s) and polymeric dispersant in the aqueous carrier medium and then dispersing or deflocculating the pigment or disperse dye.

The dispersing step may be accomplished in a horizontal mini mill, a ball mill, an attritor, or by passing the mixture through nozzles within a liquid jet interaction chamber at a liquid pressure of at least 5000 psi to produce a uniform dispersion of the pigment particles in the aqueous carrier medium.

It is generally desirable to make the pigment dispersion in concentrated form, which is subsequently diluted with a suitable liquid to the appropriate concentration for the desired viscosity, color, hue, density and print area coverage for the particular application.

The ink drop velocity, drop volume, and stream stability are greatly affected by the surface tension and the viscosity of the ink. Pigmented ink jet inks suitable for use with ink jet printing systems should have a surface tension in the range of about 20 dyne/cm to about 80 dyne/cm and, more preferably, in the range 25 dyne/cm to about 75 dyne/cm at 20° C. Acceptable viscosities are no greater than 20 cP, and preferably in the range of about 1.0 cP to about 10.0 cP at 20° C.

EXAMPLES

The invention will now be further illustrated by, but not limited to, the following examples, in which parts and percentages are by weight unless otherwise noted.

GLOSSARY

PSEPVE—perfluoro-3,6-dioxa-5-trifluoromethyl-oct-7-enyl sulfonyl fluoride
TFE—tetrafluoroethylene
EVE—tetrafluoroethylene with methyl perfluoro-4,7-dioxa-5-trifluoromethyl-non-8-enecarboxylate
Triton® X100 surfactant—manufactured by Union Carbide, Industrial Chemicals Division, Danbury, Conn.

Polymeric Emulsifier Synthesis

Polymeric Emulsifier, BMA//BMA/MAA 10//5/10 was prepared using the following procedure:

A 1—1 flask was equipped with a mechanical stirrer, thermometer, N2 inlet, drying tube outlet, and addition funnels. Tetrahydrofurane (THF), 88 g, and mesitylene, 0.1 g were charged into the flask. The catalyst tetrabutyl ammonium m-chlorobenzoate, 230 ml of a 1.0 M solution in THF was then added. Initiator, 1,1-bis(trimethylsiloxy)-2-methyl propene, 5.0 g (0.02 mol), was injected. Feed I (tetrabutyl ammonium m-chlorobenzoate, 230 ml of a 1.0 M solution in THF) was started and added over 130 minutes. Feed II (trimethylsilyl methacrylic acid, 32.70 g and butyl methacrylate, 13.75 g) was started at 0.0 minutes and added over 30 minutes. Thirty minutes after Feed II was completed (over 99% of the monomer reacted), Feed III (butyl methacrylate 27.5 g), was started and added over 60 minutes. Sixty minutes after Feed III was completed, 10 g of methanol were added. Then 24 g of trimethylmethoxysilane and solvents were stripped out. This made a BMA//BMA/MAA polymer at 40% solids.

The above block polymer was neutralized to 80% equivalency by adding 45.5% KOH solution. The neutralized polymer was then inverted into a water dispersion by adding deionized water to dilute the final dispersion to 20% solids. The resulting water dispersion was used as Polymeric Emulsifier in preparing the core-shell emulsion polymers described in preparations 1–5.

Core/Shell Emulsion Preparation 1:

A core/shell polymer of 86% of n-butylacrylate and 14% methyl methacrylate with a Polymeric Emulsifier, (BMA//BMA/MAA 10//5/10) and 2% of n-butylmercaptan chain transfer agent was prepared by the following procedure:

A resin kettle was equipped with a dropping funnel, nitrogen inlet, condenser, thermometer, heating mantle and stirrer.

Preemulsification Step:

|  | IA 30/70 MMA/BA | IB 90/10 BA/MMA |
|---|---|---|
| n-Butylacrylate | 36.40 g | 187.20 g |
| Methylmethacrylate | 15.60 g | 20.80 g |
| n-Butylmercaptan | 1.04 g | 4.16 g |
| Polymeric Emulsifier | 26.00 g | 104.00 g |
| (20% solids) | (5.2 g sol) | (20.8 g sol) |
| Deionized water | 30.6 g | 122.4 g |
| Total | 109.64 g | 438.56 g |

For each preemulsified mixture, water and Polymeric Emulsifier were added to the kettle, monomers and mercaptan were added slowly thereto with high mixing speed. Stirring was continued for 30 min to obtain a smooth emulsion.

Latex Polymerization:

|  | INGREDIENT | AMOUNT (g) |
|---|---|---|
| Feed IA: | Preemulsified mixture | 109.64 |
| Feed IB: | Preemulsified mixture | 438.56 |
| Feed II: | Deionized water | 20.00 |
|  | Sodium bisulfite | 0.27 |
| Feed III: | Deionized water | 6.30 |
|  | Ammonium persulfate | 0.47 |
| Feed IV: | Deionized water | 6.30 |
|  | Ammonium persulfate | 0.10 |

193 g of water were added to the kettle and heated to 72° C. All of feed IA, 10% of feed II and all of feed III were added to the kettle and the temperature exothermed to 88° C. All of feed IB and rest of feed II were fed into the kettle over 75 minutes. The kettle temperature was maintained at 80–85° C. Approximately halfway through this step, ⅓ of feed IV was added. After feeds IB and II were completed, an additional ⅓ of feed IV was added. After an additional 15 minutes the final ⅓ of feed IV and 100 g of water were added. The reaction was maintained at 80–85° C. for additional 120 minutes. After cooling, the product was filtered.

Core/Shell Emulsion Preparation 2:

A core/shell polymer of 82% of n-butylacrylate and 18% methyl methacrylate with a Polymeric Emulsifier, (BMA//BMA/MAA 10//5/10) and 2% of butylmercaptan chain transfer agent was prepared by the following procedure:

A resin kettle was equipped with a dropping funnel, nitrogen inlet, condenser, thermometer, heating mantle and stirrer.

Preemulsification Step:

|  | IA 50/50 MMA/BA | IB 90/10 BA/MMA |
|---|---|---|
| n-Butylacrylate | 26.00 g | 187.2 g |
| Methylmethacrylate | 26.00 g | 20.80 g |
| n-Butylmercaptan | 1.04 g | 4.16 g |
| Polymeric Emulsifier | 26.00 g | 104.00 g |
| (20% solids) | (5.2 g sol) | (20.8 g sol) |
| Deionized water | 70.60 g | 162.4 g |
| Total | 109.64 g | 438.56 g |

For each preemulsified mixture, water and Polymeric Emulsifier were added to the kettle. Monomers and mercaptan were added slowly thereto with high mixing speed. Stirring was continued for 30 min to obtain a smooth emulsion.

Latex Polymerization:

|  | INGREDIENT | AMOUNT (g) |
|---|---|---|
| Feed IA: | Preemulsified mixture | 109.64 |
| Feed IB: | Preemulsified mixture | 438.56 |
| Feed II: | Deionized water | 20.00 |
|  | Sodium bisulfite | 0.27 |
| Feed III: | Deionized water | 6.30 |
|  | Ammonium persulfate | 0.47 |
| Feed IV: | Deionized water | 6.30 |
|  | Ammonium persulfate | 0.10 |

163 g of water were added to the kettle and heated to 72° C. All of feed IA, 10% of feed II and all of feed III were added to the kettle and the temperature exothermed to 88° C. All of feed IB and rest of feed II were fed into the kettle over 75 minutes. The kettle temperature was maintained at 80–85° C. Approximately halfway through this step, ⅓ of feed IV was added. After feeds IB and II were completed, an additional ⅓ of feed IV was added. After an additional 15 minutes the final ⅓ of feed IV and 50 g of water were added. The reaction was maintained at 80–85° C. for additional 120 minutes. After cooling, the product was filtered.

Core/Shell Emulsion Preparation 3:

A core/shell polymer of 78% of n-butylacrylate and 22% methyl methacrylate with a Polymeric Emulsifier, (BMA// BMA/MAA 10//5/10) and 2% of n-butylmercaptan chain transfer agent was prepared by the procedure described in core/shell emulsion preparation 2 with the following exception: Feed 1A had the following composition:

|  | IA 70/30 MMA/BA |
|---|---|
| n-Butylacrylate | 15.60 g |
| Methylmethacrylate | 36.40 g |
| n-Butylmercaptan | 1.04 g |
| Polymeric Emulsifier | 26.00 g |
| (20% solids) | (5.2 g sol) |
| Deionized water | 70.60 g |

CORE/SHELL EMULSION PREPARATION 4:

A core/shell polymer of 74% of n-butylacrylate and 26% methyl methacrylate with a Polymeric Emulsifier, (BMA// BMA/MAA 10//5/10) and 2% of n-butylmercaptan chain transfer agent was prepared by the procedure described in core/shell emulsion preparation 2 with the following exception: Feed 1A had the following composition:

|  | IA 90/10 MMA/BA |
|---|---|
| n-Butylacrylate | 5.20 g |
| Methylmethacrylate | 46.80 g |
| n-Butylmercaptan | 1.04 g |
| Polymeric Emulsifier | 26.00 g |
| (20% solids) | (5.2 g sol) |
| Deionized water | 70.60 g |

Core/Shell Emulsion Preparation 5:

A core/shell polymer of 72% of n-butylacrylate and 28% methyl methacrylate with a Polymeric Emulsifier, (BMA// BMA/MAA 10//5/10) and 2% of n-butylmercaptan chain transfer agent was prepared by the procedure described in core/shell emulsion preparation 2 with the following exception: Feed 1A had the following composition:

|  | IA 100 MMA |
|---|---|
| Methylmethacrylate | 52.00 g |
| n-Butylmercaptan | 1.04 g |
| Polymeric Emulsifier | 26.00 g |
| (20% solids) | (5.2 g sol) |
| Deionized water | 70.60 g |

Core/Shell Emulsion Preparation 6:

An emulsion polymer of n-butylmethacrylate core, methyl methacrylate shell emulsion was prepared by the following procedure: Water, 233 g; n-butyl methacrylate, 20 g; and Arquad® 12-50, 7.5 g, were charged to the reactor equipped with a mechanical stirrer, thermocouple and addition funnels. The contents of the reactor were brought to reflux. In a separate flask, Feed 1 (water, 265 g; n-butylmethacrylate, 180 g; Arquad® 12-50, 42.5 g) was intimately mixed using an Eppenbach homogenizer. At the point of reflux, Feed 1 was then added to the reaction flask over a period of 90 min. At the same time, water, 22.5 g; and VA-044 (from WAKO), 0.75 g; were added to the reaction flask over a period of 60 min. Upon complete addition of Feed 1, Feed 2 (methyl methacrylate, 50 g) was added over 20 min. The content in the reaction flask was then kept at reflux for an additional 10 min. after which a mixture of water, 12.5 g; and VA-044 (from WAKO), 0.75 g; was added to the reaction flask.

The contents in the reaction flask were kept at reflux for an additional 60 min. and then cooled to room temperature. The resultant emulsion was at 33% solids.

Fluoropolymer Preparation 1:

This shows the preparation of $(CF_2CF_2)_n(CF_2C(OCF_2C(CF_2)F-OCF_2CF_2SO_2H)F)$ emulsion.

Step 1: Preparation of poly TFE/PSEPVE colloid

The polymerization medium was prepared in an enclosed food blender purged with N2, and consisted of:

50 mL deoxygenated water 150 g PSEPVE (DuPont)

Vigorous blender stirring suspended the PSEPVE in the water. Then the following ingredients were added:

| INGREDIENT | AMOUNT (GM/ML) |
|---|---|
| $nC_7F_{15}CO_2NH_4$ (3M, FC-143) | 6 g |
| Distilled Water | 5 mL |
| Citric acid | 0.28 g |
| $FeSO_4 \% 7H_2O$ | 0.31 g |
| $(NH_4)_2S_2O_8$ in 5 mL $H_2O$ | 1.6 g |

The mixture was stirred cautiously to prevent excessive foaming. The stirred mixture was N2 pressure transferred to a 1 liter stirred autoclave. Just before closing the vessel, a solution of 1.3 g $NaHSO_3$ in 10 mL $H_2O$ was added. The closed vessel was stirred and kept under 125 psi TFE pressure for 3 hrs during which time 100 g TFE was consumed. The colorless colloidal suspension weighed 669 g and contained 26.8% solids.

Step 2: Conversion to the free sulfonic acid emulsion

The sulfonyl fluoride was hydrolyzed by mixing 100 g of the above colloid with 100 mL concentrated ammonium hydroxide. After 1 week at room temperature, the excess water and ammonia (100 mL) were removed by evaporation. The system was still colloidal. The product was precipitated by pouring into 200 mL hot 1 part concentrated $H_2SO_4$: 2 parts water. The gel-like product was cleaned by repeated suspending in water followed by centrifugation and decantation until the washings were neutral to pH test paper. The final product dispersed in water by simple shaking to give an 8% solids suspension.

Triton® X100 surfactant was added to the emulsion as supplied to give 10% surfactant by weight. Potassium hydroxide was added and the suspension was sonicated. The final pH was 10.7.

Dispersant Preparation 1:

An ETEGMA//BZMA//MAA 4//15//12 triblock copolymer was prepared using the following procedure:

A 1-liter flask was equipped with a mechanical stirrer, thermometer, N2 inlet, drying tube outlet, and addition funnels. Tetrahydrofuran (THF), 83 g, and mesitylene, 0.1 g, were charged to the flask. The catalyst tetrabutyl ammonium m-chlorobenzoate, 230 µl of a 1.0 M solution in THF, was then added. Initiator, 1,1-bis(trimethylsiloxy)-2-methyl propene, 5.0 g (0.020 mol), was injected. Feed I [tetrabutyl ammonium m-chlorobenzoate, 230 µl of a 1.0 M solution in THF] was started and added over 130 minutes. Feed II [trimethylsilyl methacrylic acid, 40.86 g (0.250 mol)] was started at 0.0 minutes and added over 30 minutes. Thirty minutes after Feed II was completed (over 99% of the monomer had reacted), Feed II [benzyl methacrylate, 56.90 g (0.323 mol)], was started and added over 60 minutes. Ten minutes after Feed III was completed (over 99% monomers had reacted), Feed IV [ethoxytriethylene glycol methacrylate, 21.21 g (0.0862 mol)] was started and added over 30 minutes.

At 150 minutes, 12 g of methanol were added. Then 98 g of solvents and trimethylmethoxysilane were stripped out and replaced with 153 g 2-pyrrolidone. This made a ETEGMA//BZMA//MAA 4//15//12 polymer at 40% solids.

The above block polymer was neutralized using the following procedure: The ETEGMA//BZMA//MAA block polymer prepared above was neutralized to 80% by adding 45% aqueous potassium hydroxide solution to the block copolymer solution and mixing until a homogeneous solution was obtained. After neutralization the material was reduced to approximately 10% solids with deionized water.

| INGREDIENT | AMOUNT (GMS) |
| --- | --- |
| Polymer Solution (40% Solids) | 100 |
| Potassium Hydroxide (45% Solution in deionized water) | 11 |
| Deionized water | 289 |
| Total | 400 |
| WT % Solids: | 10 |
| pH: 8 | |

Dispersant Preparation 2:

The following is an example of how to make an ABC triiblock polymer with an A block of ethoxytriethyleneglycol methacrylate ETEGMA, a B block of benzyl methacrylate BZMA and a C block of methacrylic acid MAA (ETEGMA//BZMA//MAA 4//12//12).

A 12-liter flask was equipped with a mechanical stirrer, thermometer, N2 inlet, drying tube outlet, and addition funnels. Tetrahydrofuran THF, 3701 gm, and mesitylene, 13.7 gm, were charged to the flask. The catalyst, tetrabutyl ammonium m-chlorobenzoate, 2.4 ml of a 1.0 M solution in acetonitrile, was then added. Initiator, 1,1-bis(trimethylsiloxy)-2-methyl propene, 180.1 gm (0.776 M) was injected. Feed I [tetrabutyl ammonium m-chlorobenzoate, 2.4 ml of a 1.0 M solution in acetonitrile] was started and added over 185 minutes. Feed II [trimethylsilyl methacrylate, 1471 gm (9.30 M)] was started at 0.0 minutes and added over 45 minutes. One hundred and eighty minutes after Feed II was completed (over 99% of the monomers had reacted), Feed III [benzyl methacrylate, 1639 gm (9.31 M) was started and added over 30 minutes. Forty minutes after Feed III was completed (over 99% of the monomers had reacted), Feed IV [ethoxytriethyleneglycol methacrylate, 765 gm (3.10 M) was started and added over 30 minutes.

At 400 minutes, 720 gm of methanol was added to the above solution and distillation begun. During the first stage of distillation, 764.0 gm of material were removed. Then more methanol, 304.0 gm, was added and an additional 1992.0 gm of material were distilled out. Finally, I-propanol, 480 gm total, was added. A total of 2756 gms of solvent were removed. It was at 49.7% solids.

The polymer had a composition of ETEGMA//BZMA//MAA 4//12//12. It had a molecular weight of Mn=4,200.

Dispersant Preparation 3:

This shows the preparation of a cationic polymer used to disperse the pigments. It is a BzMA//DMAEMA 10//20 diblock polymer.

A 12-liter flask was equipped with a mechanical stirrer, thermometer, N2 inlet, drying tube outlet, and addition funnels. Tetrahydrofuran THF, 4002 g, and p-xylene, 7.7 g, were charged to the flask. The catalyst, tetrabutyl ammonium m-chlorobenzoate, 2.0 ml of a 1.0 M solution in acetonitrile, was then added. Initiator, 1-methoxy-1-trimethylsiloxy-2-methyl propene, 155.1 g (0.891M) was injected. Feed I [2-dimethylaminoethyl methacrylate DMAEMA, 2801 g (17.8M)] was started at 0.0 minutes and added over 45 minutes. One hundred minutes after Feed I was completed (over 99% of the monomers had reacted), Feed II [benzylmethacrylate, 1568 g (8.91 M)] was started and added over 30 minutes. At 400 minutes, 310 g of dry methanol were added to the above solution and distillation begun. A total of 1725 g of solvent was removed. I-propanol, 1783 g, was added after completion of the distillation. This made a BZMA//DMAEMA 10//20 diblock polymer at 49.6% solids with Mn 5000.

Preparation of Pigment Dispersion 1:

A 1-liter beaker was equipped with a mechanical stirrer. Into the beaker was placed 94 g of the Dispersant 1 and 13 g water. With stirring, 18.7 g FW 18 black pigment (Degussa Corp., Ridgefield Park, N.J.) were added in small portions. When the mixture was thoroughly combined, it was passed through a model M-110F Microfluidizer (Microfluidics Corp., Newton, Mass.) five times. The particle size after microfluidization was 108 nm; and pigment concentration of the dispersion was 15%.

Preparation of Pigment Dispersion 2:

This shows the preparation of an anionic cyan pigment dispersion using a ETEGMA/BzMA/MAA 4/12/12 triblock polymer and a 2 roll mill.

A cyan pigment dispersion was prepared using the following procedure:

The following ingredients were mixed:

| INGREDIENT | AMOUNT (GM) |
| --- | --- |
| Dispersant Polymer from Preparation 2 (49.7% solids) | 402.4 |
| Phthalocyanine pigment | 300 |
| Diethylene glycol | 45 |

This mixture was then charged to a 2 roll mill and processed for 30 minutes. This made a pigment dispersion that contained 55% pigment and 36.7% polymer.

This 2 roll mill chip was then dissolved using potassium hydroxide as the neutralizing agent to make an aqueous pigment concentrate.

An aqueous pigment dispersion concentrate was pepared by mixing the following ingredients with adequate stirring:

| INGREDIENT | AMOUNT (GM) |
| --- | --- |
| Pigment dispersion | 72.7 |
| 45.9% solution KOH in water | 9 |
| Deionized water | 318 |

This made an aqueous, pigment concentrate that contained 9.55% pigment and had 90 mole % of the acid groups from the polymer neutralized with KOH.

Preparation of Pigment Dispersion 3:

This shows the preparation of a cationic cyan pigment dispersion using a BzMA//DMAEMA 10//20 diblock polymer and a 2 roll mill.

A cyan pigment dispersion was prepared using the following procedure:

The following ingredients were mixed:

| INGREDIENT | AMOUNT (g) |
| --- | --- |
| Polymer from Polymer preparation 3 | 203.2 |
| Heliogen 7072DD PB15 pigment (from BASF) | 150.0 |
| 1-propanol | 450.0 |

This mixture was then charged to a 2 roll mill and process for 45 minutes. This made a pigment dispersion chip that contained 60% pigment and 40% polymer. It had a P/D= 1.5/1. This 2 roll mill chip was then dissolved using phosphoric acid as the neutralizing agent to make an aqueous pigment concentrate. An aqueous cyan pigment dispersion concentrate was prepared by mixing the following ingredients with adequate stirring:

| INGREDIENT | AMOUNT (g) |
| --- | --- |
| Cyan Pigment dispersion (from Dispersion Preparation 2) | 33.3 |
| Phosphoric acid (86.0%) | 5.47 |
| Deionized water | 161.23 |

This made an aqueous, cyan pigment concentrate that contained 10% pigment and had 90 mole % of the amine groups from the polymer neutralized with phosphoric acid.

Example 1

An ink was prepared by combining the following ingredients with magnetic stirring over 10–15 minutes:

| INGREDIENT | AMOUNT (g) |
| --- | --- |
| Pigment Dispersion 1 | 26.7 |
| 2-pyrrolidone | 6 |
| Liponics ® EG-1, Lipo Chemical Co., Paterson, NJ | 8 |
| Deionized water | 62.3 |

Testing Procedure For Core/Shell Emulsion Additive Containing Inks And Control Inks:

Core/shell emulsion additives described in the Emulsion Preparation Examples 1–5 were added in the amount of 3% by weight to equal portions of the above ink. The inks were jetted out of a Hewlett Packard DeskJet® Printer (Hewlett Packard, Palo Alto, Calif.) in a pattern of seven parallel ⅛ inch solid black lines, spaced ⅛ inch apart. Image quality and pen performance was excellent in all cases. The images were left 24 hours and then marked with double strokes of a commercial yellow highlighter pen. Black smear onto the non-imaged portions of the paper was measured. All inks containing the core/shell emulsions (3% by weight) described in the emulsion preparation examples 1–5 showed a dramatic improvement in the highlighter smear as seen from the results in the following table:

| INK SAMPLE | ORIGINAL O.D. | SMEARED O.D. |
| --- | --- | --- |
| Black Ink (control) | 1.57 | 0.250 |
| Black Ink + Core/shell Emulsion 1* | 1.53 | 0.070 |
| Black Ink + Core/shell Emulsion 2* | 1.54 | 0.055 |
| Black Ink + Core/shell Emulsion 3* | 1.50 | 0.125 |
| Black Ink + Core/shell Emulsion 4* | 1.49 | 0.075 |
| Black Ink + Core/shell Emulsion 5* | | 0.060 |

*all emulsions were added to the control ink at 3% by weight

Example 2

Inks were made from cyan pigment dispersions. The dispersant was 4//12//12 ETEGMA//BzMA//MAA block terpolymer made by GTP. The pigment was dispersed with this polymer in a two-roll mill. The ink had the following composition:

| INGREDIENT | AMOUNT (% BY WEIGHT) |
| --- | --- |
| Phthalocyanine pigment | 2.5 |
| 2-pyrrolidone | 6.5 |
| Liponics ® EG-1, Lipo Chemicals, Paterson, NJ | 5.0 |
| Isopropanol | 2.0 |
| Multranol ® 4012, Miles, Inc., Pittsburgh, PA | 1.5 |

The example ink contained 4.3% PTFE/PSEPVE emulsion from Fluoropolymer Emulsion Preparation 1.

Testing Procedure For Fluoropolymer Emulsion Additive Containing Inks And Control Inks:

The inks were tested in modified pens on the Hewlett-Packard 550C printer. The drop weight was measured by firing the pens into a pan on an analytical balance and calculating average drop weight. The volume variation is the variation in drop volume as the firing energy of the pen is varied across its operating range.

Waterfastness was measured by dripping water on a series of printed lines and measuring optical density of the run-off after drying. The drip was measured initially after printing and after a 1 hour and 24 hour delay. Highlighter smear was measured by running an acid and base highlighter across a series of printed lines and measuring optical density of the smeared off ink. The rub test was a dry rub done using 30 strokes with a Sutherland ink rub tester. Test were done immediately after printing. Maximum optical density of the rubbed off ink was measured.

| Sample # | Binder | Drop Volume (pl) | Volurme Variation (pl) | Rub Test (mOD) |
|---|---|---|---|---|
| Control A | none | 29.2 | 2.3 | 117 |
| Example 2 | 4.3% PTFE/PSEPVE | 30.2 | 1.7 | 78 |
| Control B | 1% Butyl acrylate emulsion | 29.8 | 2.4 | 65 |
| Control C | 4.2% Butyl acrylate emulsion | 26.2 | 4.8 | 76 |

| | Waterfastness (mOD) | | | Highlighter (Acid) | | | Highlighter (Base) | | |
|---|---|---|---|---|---|---|---|---|---|
| Sample # | Init. | 1 hr | 24 hrs | Init. | 1 hr | 24 hrs | Init. | 1 hr | 24 hrs |
| Control A | 195 | 75 | 10 | 96 | 113 | 86 | 215 | 169 | 151 |
| Example 2 | 99 | 26 | 19 | 57 | 112 | 48 | 202 | 180 | 105 |
| Control B | 375 | 131 | 12 | 46 | 124 | 55 | 171 | 153 | 198 |
| Control C | 163 | 62 | 2 | 20 | 49 | 33 | 118 | 96 | 88 |

The inks containing the PTFE/PSEPVE emulsion gave improved performance of the pen as measured by drop volume variation. There is less variation as the pen energy is varied than with no emulsion or with the acrylic emulsion. These inks also gave improved initial waterfastness immediately after the print is made and less smear with the hilighter test and better rub resistance than with no polymer additive.

Example 3

Control Ink 3:

A cyan ink was made with the following formula:

| INGREDIENT | AMOUNT (g) |
|---|---|
| Cyan Dispersion from Preparation 3 | 10 |
| 2-Ethyl-2-Hydroxymethyl-1,3-propanediol | 18 |
| Deionized water | 72 |

Example Ink 3:

A cyan ink was made with the following formula:

| INGREDIENT | AMOUNT (g) |
|---|---|
| Cyan Dispersion Concentrate 1 | 10 |
| 2-Ethyl-2-Hydroxymethyl-1,3-propanediol | 18 |
| Emulsion Polymer 6 | 15 |
| Deionized water | 57 |

Ink Control 3 and Ink Example 3 were applied onto Gilbert bond paper. The resistance of the image to water drip and twice-marked highlighter rubbing were measured at time intervals of 5 minutes, 1 hour and 24 hours after image was laid on paper.

A rating of 1–4 is used. For resistance to water drip, a rating of 1 is best while a rating of 4 is worst.

| | After | | |
|---|---|---|---|
| | 5 min. | 1 hr. | 24 hr. |
| WATERDRIP RESISTANCE | | | |
| Control Ink 3 | 4 | 4 | 4 |
| Example Ink 3 | 3 | 2 | 1 |
| HIGHLIGHTER RESISTANCE | | | |
| Control Ink 3 | 4 | 4 | 4 |
| Example Ink 3 | 2 | 2 | 1 |

What is claimed is:

1. An ink jet ink comprising:
   a) an aqueous carrier medium;
   b) an insoluble colorant;
   c) a dispersant; and
   d) an emulsion polymer additive selected from the group consisting of
      i) emulsion polymers having a core/shell structure comprising a first phase having a Tg above ambient temperature and a second phase having a Tg below ambient temperature, wherein at least one of the first and second phases comprises an acrylic polymer; and
      ii) tetrafluoroethylene emulsion polymers;
   wherein the emulsion polymer additive is present in an amount of from 0.01% to 15% by weight based on the total weight of the ink composition;
   wherein said ink composition has a viscosity of less than 20 cP at 20° C. and a surface tension of 25 to 75 dynes/cm at 20° C.

2. The ink of claim 1, wherein said ink comprises a thermal ink jet ink and wherein said emulsion polymer additive is present in an amount of 0.01% to 5% by weight, based on the total weight of the ink.

3. The ink of claim 2, wherein the emulsion polymer additive has a core/shell structure and wherein said second phase comprises and acrylic polymer made from monomers selected from the group consisting of acrylates, methacrylates and mixtures thereof.

4. The ink of claim 3 wherein the monomer is an acrylate selected from the group consisting of butyl, ethyl, ethylhexyl, methyl, hydroxyethyl, propyl, ethoxylethyl and benzyl acrylate.

5. The ink of claim 3 wherein the monomer is a methacrylate selected from the group consisting of ethylhexyl, lauryl, octyl, hexyl, acetylacetoxy, n-butyl, tris(trimethylsiloxy)-silylpropyl methacrylate.

6. The ink of claim 3 wherein said first phase is prepared from a monomer selected from the group consisting of styrene, methyl-styrene, vinyl pyrrolidone, methacrylates and mixtures thereof.

7. The ink of claim 6 wherein the monomer is a methacrylate selected from the group consisting of isobutyl, methyl, hydroxyethyl, isobornyl, propyl, benzyl, ethyl, cyclohexyl, benzyl and glycidyl methacrylate.

8. The ink of claim 3 wherein the second phase comprises 55 to 95% of the core/shell emulsion polymer by weight and wherein the first phase comprises 5 to 45% of the core-shell emulsion polymer by weight.

9. The ink of claim 8, wherein said insoluble colorant comprises a pigment, wherein said dispersant comprises a block copolymer dispersant, and wherein said ink contains 0.1 to 8% pigment, 0.1 to 8% block copolymer dispersant, and 70 to 97.5% aqueous carrier medium, wherein the percentages are weight percentages of the total ink composition.

10. The ink of claim 1 wherein said emulsion polymer additive is present in an amount of 5.1 to 20% solids by weight, based on the total weight of the ink.

11. The ink of claim 10, wherein the emulsion polymer additive has a core/shell structure and wherein said second phase comprises an acrylic polymer made from monomers selected from the group consisting of acrylates, methacrylates and mixtures thereof.

12. The ink of claim 11 wherein the monomer is an acrylate selected from the group consisting of butyl, ethyl, ethylhexyl, methyl, hydroxyethyl, propyl, ethoxyethyl and benzyl acrylate.

13. The ink of claim 11 wherein the monomer is a methacrylate selected from the group consisting of ethylhexyl, lauryl, octyl, hexyl, acetylacetoxy, n-butyl, tris (trimethylsiloxy)-silylpropyl methacrylate.

14. The ink of claim 11 wherein said first phase is prepared from a monomer selected from the group consisting of styrene, methyl-styrene, vinyl pyrrolidone, methacrylates and mixtures thereof.

15. The ink of claim 14 wherein the monomer is a methacrylate selected from the group consisting of isobutyl, methyl, hydroxyethyl, isobornyl, propyl, benzyl, ethyl, cyclohexyl, benzyl and glycidyl methacrylate.

16. The ink of claim 11 wherein the second phase comprises 55 to 95% of the core/shell emulsion polymer by weight and wherein the first phase comprises 5 to 45% of the core-shell emulsion polymer by weight.

17. The ink of claim 16, wherein said insoluble colorant comprises a pigment, wherein said dispersant comprises a block copolymer dispersant, and wherein said ink contains 0.1 to 8% pigment, 0.1 to 8% block copolymer dispersant, and 70 to 97.5% aqueous carrier medium, wherein the percentages are weight percentages of the total ink composition.

18. The ink of claim 1, wherein said emulsion polymer additive is a tetrafluoroethylene emulsion polymer having pendant side chain groups represented by the formula:

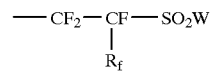

wherein $R_f$ is F, Cl, or a $C_1$ to $C_{10}$ perfluoroalkyl radical; and W is F, Cl, or OH.

19. The ink of claim 18 wherein W in the pendant side chain is F.

20. The ink of claim 18 wherein said tetrafluoroethylene emulsion polymer is prepared by reacting a fluorinated vinyl compound with a monomer containing at least one group having the formula:

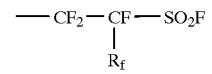

wherein $Rf$ is F, Cl, or a $C_1$ to $C_{10}$ perfluoroalkyl radical.

21. The ink of claim 20 wherein the tetrafluoroethylene emulsion polymer is a copolymer of tetrafluoroethylene and perfluoro (3,6-dioxa-4-methyl-7-octenesulfonyl fluoride).

22. The ink of claim 18 wherein the tetrafluoroethylene emulsion polymer is a copolymer of tetrafluoroethylene with at least one monomer selected from the group consisting of perfluoro-3,6-dioxa-5-trifluoromethyl-oct-7-enyl sulfonyl fluoride; methyl perfluoro-4,7-dioxa-5-trifluoromethyl-non-8-enecarboxylate; perfluoro-3,6-dioxa-5-trifluoromethyl-oct-7-enyl sulfonyl fluoride, acid form; hexafluoropropylene; and perfluoromethyl ethyl ether.

23. The ink of 18, wherein said insoluble colorant comprises a pigment, wherein said dispersant comprises a block copolymer dispersant, and wherein said ink contains 0.1 to 8% pigment, 0.1 to 8% block copolymer dispersant, and 70 to 97.5% aqueous carrier medium, wherein the percentages are weight percentages of the total ink composition.

* * * * *